July 17, 1962 D. A. BEUSCHER 3,045,066

SELECTIVE CARRIER TYPE COMMUNICATION SYSTEM

Filed March 14, 1957 4 Sheets-Sheet 1

INVENTOR.
Donald A. Beuscher
BY
Ahlberg, Wupper & Gradolph
Attys.

SELECTIVE CARRIER TYPE COMMUNICATION SYSTEM

Filed March 14, 1957 4 Sheets-Sheet 2

INVENTOR.
Donald A. Beuscher
BY
Ahlberg, Wupper & Gradolph
Attys.

July 17, 1962 D. A. BEUSCHER 3,045,066

SELECTIVE CARRIER TYPE COMMUNICATION SYSTEM

Filed March 14, 1957 4 Sheets-Sheet 3

INVENTOR.
Donald A. Beuscher
BY
Ahlberg, Wupper & Gradolph
attys.

INVENTOR.
Donald A. Beuscher
BY
Wupper, Gradolph & Love
Attys

United States Patent Office 3,045,066

Patented July 17, 1962

3,045,066

SELECTIVE CARRIER TYPE COMMUNICATION SYSTEM

Donald A. Beuscher, 1446 N. Clark St., Chicago 10, Ill.

Filed Mar. 14, 1957, Ser. No. 646,151
11 Claims. (Cl. 179—2.5)

The present invention relates to communication systems.

One of the objects of the present invention is to provide a novel communication system which can consist of a number of stations, each of which needs merely to be plugged into an electric power outlet, such that communication between the stations is by way of the power lines and in which stations in the network can communicate with any selected station in complete privacy.

An additional object is to provide improved communication units or stations of the above type such that by pushing an appropriate button or the like any station can communicate with any other station in complete privacy, while by pushing a different button, any station can communicate simultaneously with a group of stations or all of the other stations in the network.

An additional object is to provide novel communications means of the type described above such that at any time a called and a calling station are in communication with each other, a third station cannot cut in on the conversation, or in the alternative, can cut in for the purpose, for instance, of explaining that an emergency exists such that the system should be cleared for use by the third station, but in which the third station, although being heard cannot overhear any of the conversation between the called and calling stations.

Yet another object is to provide a novel communication system adapted for making use of the power lines as a portion of the network and in which a multiplicity of stations can stand by without appreciably attenuating the signal in the network.

Still another object is to provide an improved system of the type described which is not appreciably affected by noise and variation in the electrical characteristics of the power supply line.

Other objects and advantages will become apparent from the following description of a preferred embodiment of my invention, which is illustrated in the accompanying drawings.

In the drawings, in which similar characters of reference refer to similar parts throughout the several views, al four figures are diagrams of portions of a representative circuit for one of the stations. Of these:

Figure 1A:
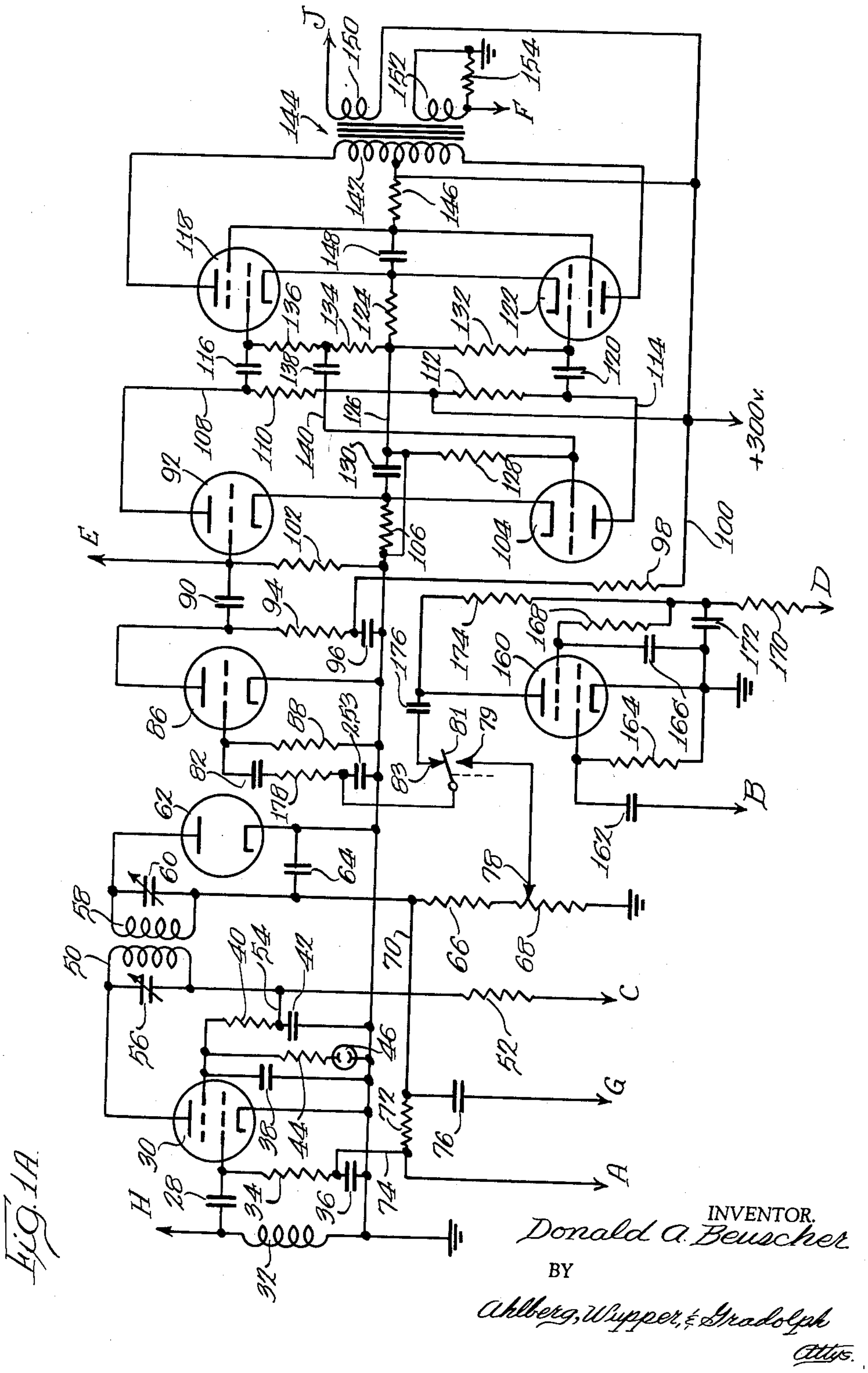
FIG. 1A is essentially the sound channel.

Communications systems are in use which consist of a plurality of stations which are merely plugged into electrical outlets so as to receive power for their operation from the power supply circuit, and which also use the power circuit as the signal network between stations. These systems are generally arranged so that if any particular station desires to talk to another station, all of the other stations on the network will overhear the conversation. Some attempts have been made to devise systems of this type which are selective, such that a particular station can call and talk with another station without being overheard by other stations on the same network, but in general such systems are limited to three or four stations and are expensive and not completely reliable.

In the present system communication may be had between any particular station and any other desired station on a network which includes a large number of stations, and during any such conversation between any two particular stations no other station on the network will be able to overhear the conversation although it is possible for any of the remaining stations to cut into the conversation to the extent of communicating with one of the stations already in a two-way conversation, but without being able to overhear the conversation between the two principal stations.

In general, the system consists in generating an oscillatory signal which is fed to the line and which is amplitude modulated by the speech signal. The connection of the line to each of the stations which might receive this signal has a high order of impedance and therefore a multiplicity of stations on the line will not have the effect of appreciably attenuating the signal so as to reduce the signal to noise ratio as is usual. All stations are transceivers which are normally conditioned to receive a signal, but the speaker system at each is cut off from the amplifiers so that a received signal is not passed on to the speaker and thus is not heard. Depressing a button, however, at any particular station, shifts the circuit at that station from the "receive" to the "transmit" position, and whenever this is done the carrier is automatically modulated by any one of several selected tone frequencies within the audible range so that the selected frequency passes through the audio circuits at the other stations. This signal or tone, which is of short duration, of the order of one-tenth of a second, acts to switch one of the other stations which is assigned the frequency of the tone, so that its audio circuit is connected to its speaker. Although the tone for selecting the desired receiving station is of short duration, the selected station is locked in for the duration of the conversation even after the tone has been cut off.

Thus if station 1 wishes to talk with a person at station 12, for instance, the No. 12 button at station 1 is depressed. This conditions station 1 for a transmitting operation and sends a station selecting tone into the network which conditions the unit at station 12 to receive. Station 1 thereafter can talk with station 12 as long as desired. As soon as the No. 12 button at station 1 is released, the person at station 12 can push the No. 1 button, which conditions the No. 12 unit for transmission and conditions the No. 1 unit to receive. Thereafter, station 12 can talk with station 1.

Since the tone sent into the line for the purpose of making a station selection lasts for a period of only approximately one-tenth of a second, and since one of the functions of this station selecting tone is to operate a relay to connect a speaker at a particular station to the output of its amplifier, it will be appreciated that ordinarily none, or at most only a small fractional portion, of the station selecting tone will be heard.

The system also includes an arrangement such that by depressing a particular button at any one of the stations, all of the others will be conditioned to receive, so that any station can talk to all of the other stations simultaneously. If desired, this last arrangement can be such that depressing a particular button conditions a certain group of stations to receive rather than all of the others.

At any time a conversation is being carried on between any two stations, for instance stations 1 and 12, any of the other stations on the network can cut in for the purpose of notifying whichever of the stations 1 and 12 is in condition to receive, that he wishes for instance to use the network, so that the system can be cleared, if advisable, for the use of this third station. The third station in doing this, however, does not overhear any of the information passing between stations 1 and 12.

Figure 1B:
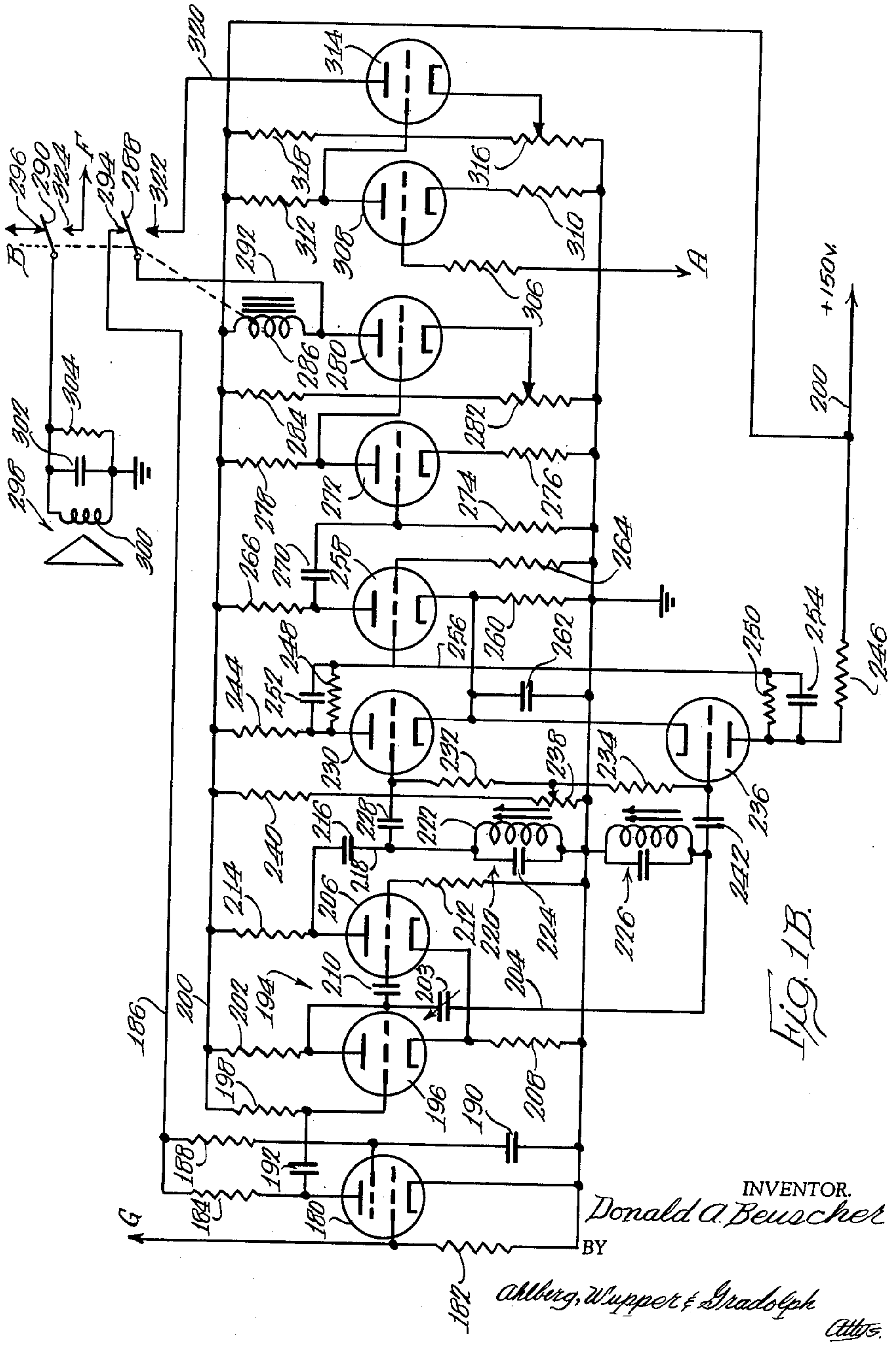
FIG. 1B is essentially the receiving control and switching circuit.
Figures 1C, 1D, 2:
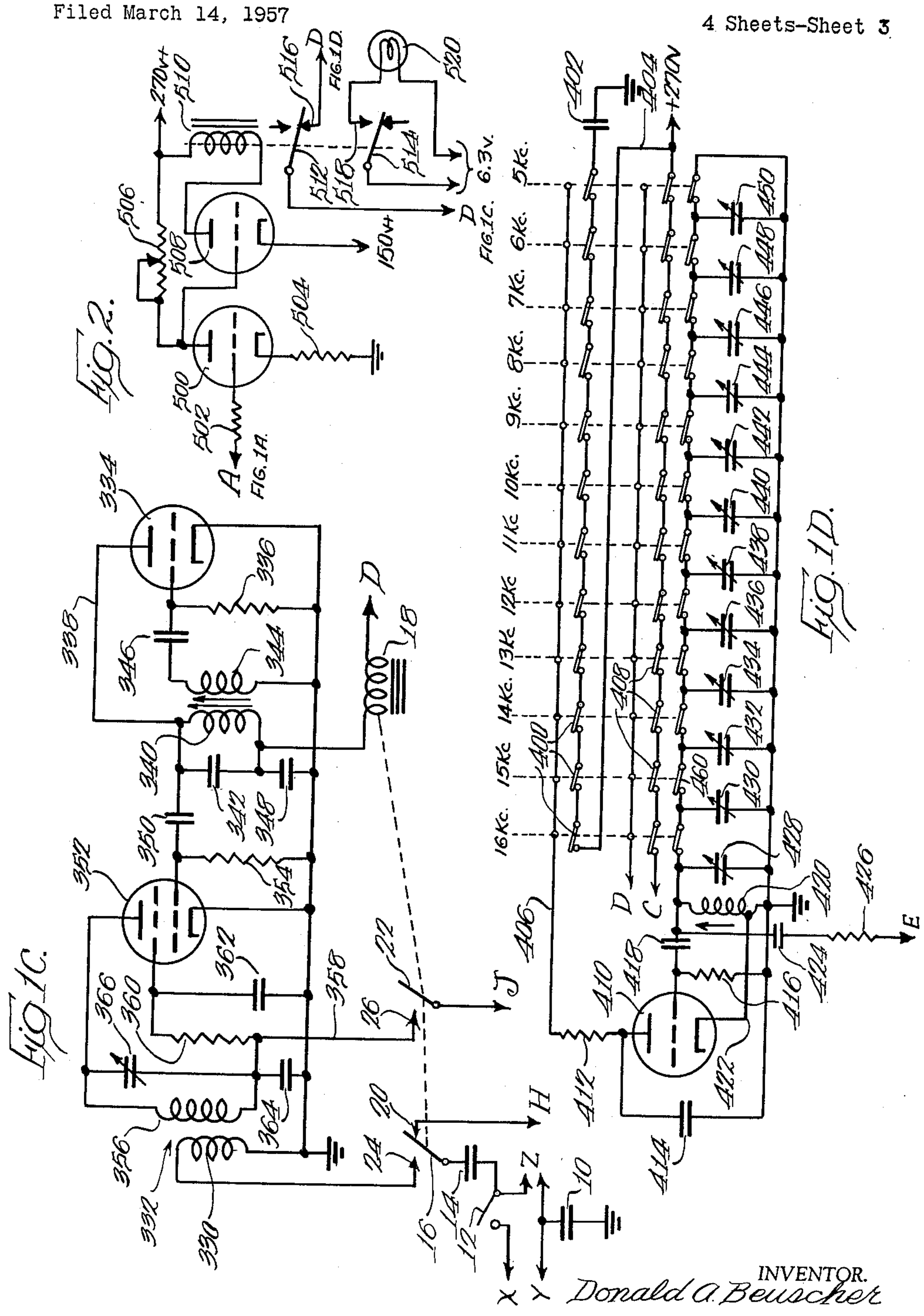
FIG. 1C is the carrier generator.
FIG. 1D is the manually controlled mechanism for selecting the station to be called and for shifting between listen and talk conditions.
FIG. 2 is an alternative circuit which may be substituted for a portion of FIG. 1A for the purpose of insuring complete privacy when using the system.
Figure 3:
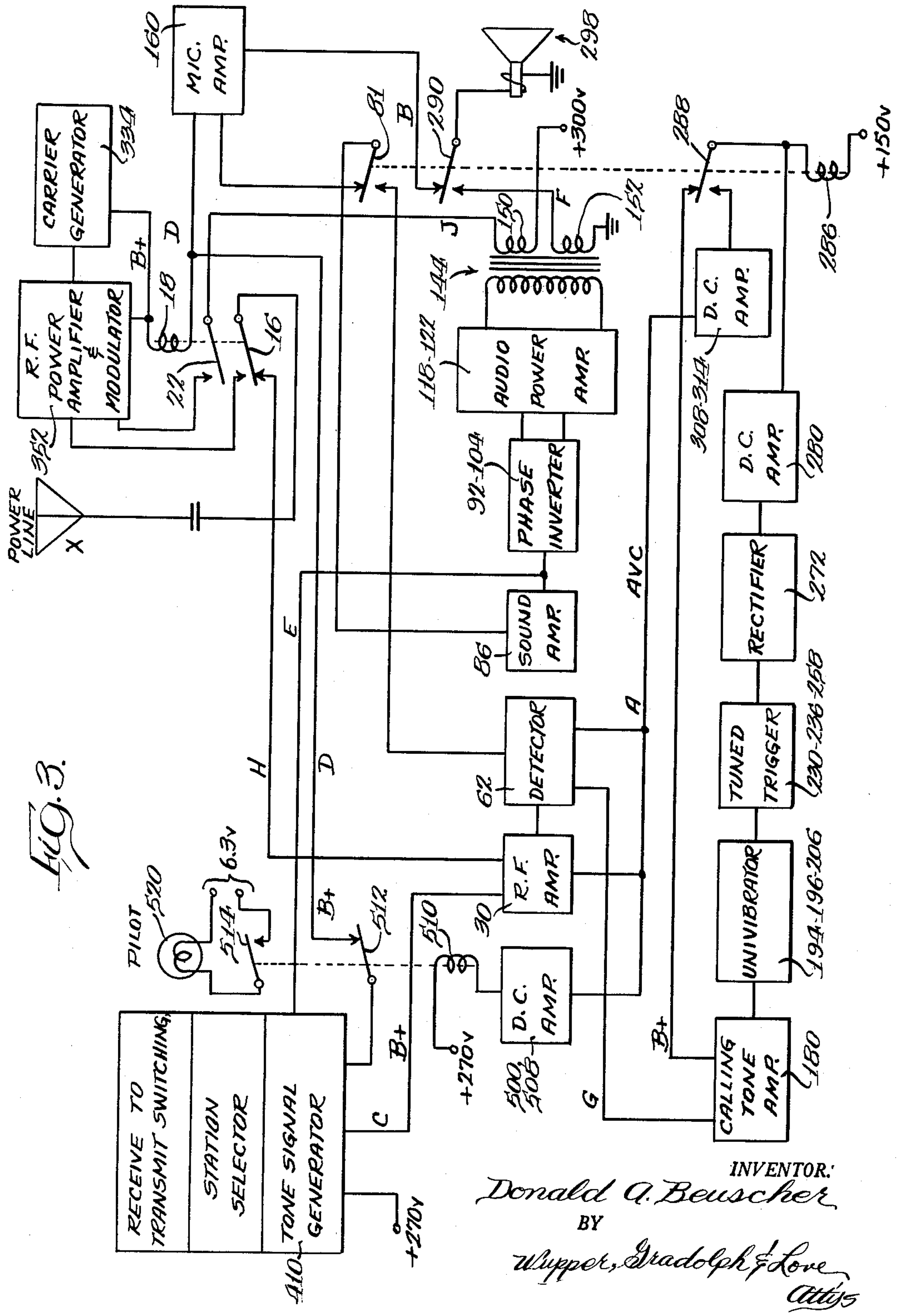
FIG. 3 is a block diagram of the system.

In the drawings, the 120-volt A.C. leads to the circuit are shown at X and Y in FIG. 1C. All other open ended leads terminated by arrows, interconnect between the several figures or the power supply and are coded with letters to facilitate tracing from one figure to another. The power supply is not shown since it may be conventional, and for this particular circuit supplies B+ potentials at 300 volts, 270 volts, and 150 volts. These voltages are applied as indicated on the several views.

Referring to FIG. 1C, one of the 110 volt leads, Y, is grounded, so far as the signal is concerned, through a capacitor 10. The other lead, X, is connected through a single pole, single throw, manually operated on-off switch 12 and capacitor 14 to a movable contact 16 actuated by a relay coil 18. When this coil is deenergized, relay contact 16 is closed against stationary contact 20 connected to a lead H which passes to the circuit of FIG. 1A. Relay coil 18 also operates a second movable contact 22 connected to a lead J from circuit 1A. When relay coil 18 is deenergized, the circuit through lead J and relay contact 26 is opened. Energization of relay coil 18 opens the circuit between relay contact 16 and stationary contact 20 and connects contact 16 to stationary contact indicated at 24. Under the same conditions, that is, energization of coil 18, relay contact 22 engages stationary contact 26. Contacts 24 and 26 are connected into the circuit of FIG. 1C which will be described in greater detail presently. When the on-off switch 12 is closed, line power is supplied to terminals Z which are intended to be connected to the power supply input.

Referring now to FIG. 1A, the line H is connected through capacitor 28 to the control grid of a tetrode RF amplifier tube 30 and through an RF choke 32 to ground. The control grid is also connected to ground through a resistor 34 and capacitor 36 in series. The cathode of tube 30 is grounded and the screen thereof is connected to ground through a capacitor 38, and to ground through a busy light circuit consisting of a resistor 44 and neon glow tube 46 in series.

The primary 50 of an RF transformer is connected at one end to the anode of tube 30 and at the other through a resistor 52 to a switched B+ lead C leading to the circuit of FIG. 1D. The lead between transformer primary 50 and resistor 52 is also connected by a branch 54 through resistor 40 to the screen and through capacitor 42 to ground. A variable capacitor 56 is connected across the primary 50 for tuning the circuit.

The transformer secondary 58, tuned by a variable capacitor 60 in parallel therewith, is connected at one end to the anode of a diode detector tube 62, while the other end is grounded through a capacitor 64. The detector cathode is also grounded. The common point between capacitor 64 and transformer primary 58 is connected through a resistor 66 and the resistor element 68 of a potentiometer to ground. An AVC voltage is developed across the resistors 66 and 68 and this is taken off from the common point between resistor 66 and transformer primary by way of a lead 70 and is fed back through a resistor 72 to an AVC voltage line A connected into the circuit of FIG. 1B. This AVC line is also connected through a branch 74 and the voltage is applied to the control grid of the RF amplifier 30 by way of resistor 34.

The demodulated signal component in the line 70 is taken off through a capacitor 76 to a line G leading to the circuit of FIG. 1B.

The moving contact of the potentiometer 68—78 is connected to a normally open stationary relay contact 79. This contact is a portion of a triple pole, double throw relay mechanism to be mentioned in greater detail presently. For the present it is sufficient to note that when the relay coil (shown as 286 in FIG. 1B) is energized, a moving relay contact 81 engages contact 79. When coil 286 is deenergized, moving contact 81 is separated from contact 79 and engages stationary contact 83.

When contacts 79—81 are closed, the signal is applied from potentiometer slides 78, through these contacts and a resistor 178 and capacitor 82 in series to the grid of an audio amplifier triode 86. Contact 81 is also connected to ground through a capacitor 253. The cathode of this tube is grounded and the grid thereof is connected to ground through a resistor 88. The anode of amplifier 86 is connected through a capacitor 90 to the grid of a phase inverter triode 92 and to ground by way of a resistor 94 and capacitor 96 in series. The common point between resistor 94 and capacitor 96 is also connected through a resistor 98 to the 300 volt B+ line indicated at 100.

The control grid of the phase inverter tube 92 is connected to ground through a resistor 102 and to the lead E which connects into the circuit of FIG. 1D, so that a signal from the circuit of FIG. 1D on this line is applied to the phase inverter tube. The phase inverter tube at 92, therefore, can accept an input signal either from the amplifier tube at 86 or from the circuit of FIG. 1D. The triode at 104 in the other half of the phase inverter has its cathode connected directly to the cathode of tube 92 and these cathodes are connected to ground through a common resistor 106. The anode of triode 92 is connected to a lead 108 connected in turn through resistors 110 and 112 in a series to a lead 114 connected to the anode of the other phase inverter tube 104. The midpoint between resistors 110 and 112 is connected to the 300 volt B+ lead at 100. Lead 108 is connected through a capacitor 116 to the control grid of a power amplifier tetrode 118 while the anode lead 114 from tube 104 is similarly connected through a capacitor 120 to the control grid of a second tetrode in push-pull relationship to the tetrode at 118. The cathodes of tubes 118 and 122 are connected together and through a resistor 124 to a ground lead 126. This lead 126 is connected through a resistor 128 to the grid of tube 104 in the phase inverter circuit and through a capacitor 130 to the cathodes of the phase inverter tubes. Lead 126 is also connected through a resistor 132 to the control grid of power tetrode 122 and by way of resistors 134 and 136 in series, to the control grid of tetrode 118. The common point between resistors 134 and 136 supplies a portion of the signal arriving at the grid of tube 118 through a capacitor 138 to a lead 140 connected to the grid of phase inverter tube 104.

The anodes of power tubes 118 and 122 are connected together through the primary 142 of an output transformer indicated generally by the numeral 144. This primary is center-tapped and the tap is connected to the 300 volt B+ line 100 and by way of a resistor 146 to the screens of both tetrodes 118 and 122. The screens are also connected through a common capacitor 148 to the interconnected cathodes of these two tubes.

The output transformer 144 has two secondaries indicated at 150 and 152. One end of the secondary 150 is connected to the 300 volt B+ lead 100, while the other end is connected to the lead J which connects into the circuit of FIG. 1C. The other secondary 52 has its ends connected through a resistor 154 and one end is grounded. The other end is connected to a lead F which extends to the circuit of FIG. 1C.

In the above circuit, an amplitude modulated RF signal applied to the input H is amplified at the RF amplifier 30 and the signal is detected at 62. The signal therefore appears in the line G and the connections to the detector circuit are such that an AVC voltage which appears at 70 is applied to the grid of the RF amplifier 30 and to the line A. If it is assumed that contacts 79—81 are closed, signals of widely varying strength appearing in the line H, therefore, appear at the input to the audio amplifier 86 at approximately the same level because of the variable grid bias on tube 30.

The amplified audio signal from the tube 86 passes through the phase inverter section at 92—104 and through the push-pull power amplifier section 118—122 and appears at the lines J and F.

Whenever there is a signal present, the voltage on the screen of tube 30 increases because of the decrease in screen current through resistor 40. This increase in potential lights the neon tube 46 and signals that the line is in use.

At the bottom center of FIG. 1A, a microphone amplifier circuit is shown. This consists of a tetrode 160 with the control grid connected through a capacitor 162 to the line B which leads to the circuit of FIG. 1B. The control grid is connected to ground through a resistor 164 and the cathode of the tube is grounded. The screen is connected to ground through a capacitor 166 and to a switched B+ line by way of resistors 168 and 170 in series. The common point between these resistors is connected to ground through a capacitor 172 and to the anode through a resistor 174. The signal from the anode is connected through a capacitor 176 is previously mentioned relay contact 83.

A low level audio frequency signal applied to the line B, therefore, is amplified by the tube 160 and thereafter passes through the main audio frequency portion of the circuit beginning with the audio amplifier 86 when contacts 81—83 are closed.

Referring now to FIG. 1B, it will be seen that the first tube at the left hand edge of the drawing indicated at 180 is connected into a tetrode amplifier circuit with the control grid thereof connected to the line G so as to receive the demodulated signal from line G of FIG. 1A. This control grid is also connected to ground through a grid resistor 182 and the cathode is grounded. The anode is connected through a resistor 184 to a switched B+ line 186. This line is also connected through resistor 188 to the tube screen and to ground through a capacitor 190.

The tube at 180 amplifies any station selecting tone, which is at any of several audio frequencies, arriving through the line G. This amplified signal is passed from the anode through a capacitor 192 and used to control the frequency of a one shot multivibrator or univibrator indicated generally at 194. The first tube of this univibrator is comprised of a triode 196 with the grid connected to receive the signal passed through the capacitor 192, this grid also being connected through resistor 198 to the 150-volt B+ line 200. The anode is connected to B+ line 200 through a resistor 202 and to an output lead 204 by way of a tuneable capacitor 203. The cathodes of tube 196 and of the second tube 206 of the multivibrator are tied together and connected to ground through a common resistor 208. The grid of the second tube 206 is connected to the first tube anode by way of a capacitor 210 and to ground through a resistor 212. The anode of the second tube 206 is connected through a resistor 214 to B+ at 200 and also by way of a capacitor 216 to an output lead 218.

A tuned circuit 220 comprised of a slug tuned inductance 222 in parallel with a capacitor 224 is connected between ground and the output lead 218. A substantially identical tuned circuit 226 is connected between ground and the other output lead 204. By movement of the coil slugs, these two circuits can be adjusted to resonate at any selected frequency within a considerable range. In the present specific example this range of resonance may be anywhere between 5 kc. and 16 kc.

The output from one of the tuned circuits is taken from the lead 218 and passed through a capacitor 228 to the control grid of a trigger tube at 230. This grid is also connected through resistors 232 and 234 in series to the grid of a second trigger tube at 236. The midpoint between resistors 232 and 234 is connected to the slider of potentiometer 238, the resistance element of which is grounded at one side, the other side being connected through a resistor 240 to the B+ line 200. The grid of the second trigger tube 236 is connected through a capacitor 242 to the other tuned circuit at 204. The anodes of the two tubes 230 and 236 are connected to the B+ line 200 by way of resistors 244 and 246, respectively, and to each other by way of resistor 248, a line 256 and resistor 250 in series. These resistors are bridged by capacitors 252 and 254, respectively.

The center point of this symmetrical network represented by the lead 256 is connected to the grid of a third triode 258 and the cathodes of the three tubes 230, 236 and 258 are all connected together and to ground through a resistor 260 and capacitor 262 in parallel. The grid of the third tube 258 is also connected to ground through a resistor 264 while the anode thereof is connected to the B+ line 200 through a resistor 266.

The output of the trigger circuit is taken from the anode of triode 258 through a capacitor 270 passed to the grid of a rectifier tube 272, the grid also being connected to ground through a resistor 274. The cathode of this tube is connected to ground through resistor 276 and the anode thereof to B+ 200 through resistor 278. The rectified output passes from the anode of triode 272 to the grid of a D.C. amplifier 280 having its cathode connected to the slider of a potentiometer 282, the resistance element of which is grounded at one end, the other end being connected through a resistor 284 to B+ line 200. The anode of the D.C. amplifier 280 is connected to the B+ line 200 through a relay coil 286 which actuates relay contacts 81, 288 and 290. In the position shown, contact 288, whic his connected through lead 292 to the anode of amplifier tube 280, is against stationary contact 294 connected to the switched B+ line 186 previously mentioned.

As shown, that is, with the coil 286 deenergized, relay contact 290 is against stationary contact 296 connected to microphone amplifier input line B leading to the circuit of FIG. 1A. Movable contact 290 is connected through the circuit of a permanent magnet dynamic combination speaker and microphone 298 to ground, this circuit including the transducer coil 300 which is in parallel with a capacitor 302 and resistor 304. When relay coil 286 is engaged, contact 290 separates from contact 296 and engages contact 324 connected to the line F of FIG. 1A.

The line A, which carries the AVC voltage from the circuit of FIG. 1A, is applied through resistor 306 to the grid of a D.C. amplifier tube 308. The cathode of this tube is connected to ground through a resistor 310 and the anode thereof to B+ line 200 through resistor 312. A second stage of the D.C. amplifier is indicated at 314 and comprises a triode having its grid connected to the anode of tube 308, the cathode thereof being connected to a potentiometer slider, the resistance element 316 of which is grounded at one end, the other end being connected through resistor 318 to B+ line 200. The anode of the second stage 314 is connected by way of line 320 to relay fixed contact 322 which is engaged by movable contact 288 whenever relay coil 286 is energized.

Referring now to FIGURE 1C, the line D connected to one end of relay coil 18 under some conditions carries a 270 volt B+ potential as will appear. The line J is supplied with a 300 volt B+ potential through the secondary 150 of the output transformer 144 of FIG. 1A. Whenever relay coil 18 is energized so as to shift relay contact 22 against contact 26 this potential is applied to line 358. Energization of relay coil 18 also shifts movable contact 16 so as to engage contact 24 thereby connecting the secondary 330 of a power output transformer 332 between ground and the power supply and communicating line X, assuming of course that power switch 12 is closed.

The triode at 334 is connected to provide a carrier oscillator circuit. The cathode thereof is grounded, the grid being connected to ground through a resistor 336 while the anode is connected through line 338 to the switched B+ line D by way of transformer primary 340 and relay coil 18 in series. This primary forms a resonant circuit with capacitor 342 connected thereacross. The secondary 344 of this transformer is grounded at one end, the other end being connected through capacitor 346 to the grid of triode 334. The common point between relay coil 18 and transformer primary 340 is connected to ground through a capacitor 348.

The signal from the carrier oscillator 334, which in the present instance operates at a frequency of approximately 100 kc. is taken from the anode of tube 334 and passed through a capacitor 350 on the first grid of a power amplifier-modulator 352. The cathode of this tube is grounded and a grid resistor 354 is connected between ground and the first grid.

The anode of tube 352 is connected to one end of the primary 356 of output transformer 332, the other end of this primary being connected to a line 358 leading to stationary relay contact 26 by way of resistor 360 to the second grid of tube 352; this second grid is also connected to ground through a capacitor 362. A capacitor 364 is connected between lead 358 and ground and the plate circuit of tetrode 352 is tuned by a variable capacitor 366 connected across transformer primary 356. FIG. 1D illustrates the circuit for selecting the station to be called and for accomplishing switching between the listen and talk positions. In this figure there are twelve vertical broken lines indicated at the upper ends by the designations "5 kc.," "6 kc." and so on to "16 kc." These lines represent manual controls which are spring loaded to the position shown, and as will appear more fully presently operate to give a station-selecting tone of the frequency indicated when actuated; for instance operation of the switches connected along the dotted line, labeled "5 kc." will give a station selecting tone of 5000 cycles per second. Similarly, actuation of the switch labeled "11 kc." will give a signal of 11,000 cycles per second and so on. Each of these controls operates three ganged switches connected as follows: The upper group of twelve switches operates essentially as one switch and therefore has been given the single designation 400. All of these switches are of single pole, double throw type and as normally closed are connected in series. One end of the series is connected to ground through a capacitor 402, while the other end of the series is connected to a line 404 connected in turn to the B+ line at 270 volts. When any one of these switches is actuated it operates to disconnect the B+ voltage from the capacitor 402 and to connect the capacitor line to one of a row of contacts (one for each switch) connected together and leading to a line 406.

The second group of switches indicated generally by the numeral 408 are also of single pole, double throw type and are connected in series in the normally closed position. One end of this series is connected to the B+ line 404, while the other end is connected to the previously mentioned switched B+ line C leading to the circuit of FIG. 1A. Whenever any one of these switches is opened, the B+ line 270 is connected directly to line D through a second set of stationary contacts such as in the switches 408 and simultaneously the 270 volt B+ line 404 is disconnected from the line C.

An oscillator triode 410 has its anode connected to line 406 by way of a resistor 412 and to ground through a capacitor 414. The grid thereof is connected to ground through a resistor 416 and through a capacitor 418 to one end of a slug tuned coil 420 the other end of which is grounded. A tap from the tuning coil 420 is connected through lead 422 to the cathode of tube 410. The common point between coil 420 and capacitor 418 is connected through a capacitor 424 and resistor 420 to the previously mentioned line E. A variable capacitor 428 is connected across the coil 420 and is so adjusted as to give a frequency of oscillation in the present instance of 16 kc.

To the right of capacitor 428 are eleven additional capacitors indicated, respectively, by the numerals 430, 432, 434, 436, 438, 440, 442, 444, 446, 448 and 450. As additional ones of these are connected in parallel with the capacitor at 428, the frequency of resonance of the oscillator circuit decreases by one kc. The third bank of 12 switches indicated generally by the numeral 460 are connected in series, one end of the series being grounded while the other end is connected to the common point between coil 420 and capacitor 428. One end of each of the variable capacitors from 430 to 450 is grounded, the other end of these in succession being connected between successive switches of the bank at 460 so that if the first selector switch labeled "16 kc." is actuated, the first switch from the left in the bank 460 is opened, thereby placing capacitor 428 only across tuning coil 420. If the next switch at 15 kc. is actuated, this leaves capacitors 428 and 430 in parallel across tuning coil 420, and disconnects the remaining capacitors in the bank, and so on. When all of the switches are in the normally closed position, as shown, the resonant circuit is shorted to ground, thereby preventing oscillation.

The circuit operates in the following fashion: Assume that power switch 12 is closed so as to energize the appropriate power supply from the leads Z and to condition the circuit for use. Under these conditions the tube heaters, not shown, will be energized and each of the B+ leads will be supplied with the designated voltage. All of the manually actuated switches in FIG. 1D will be in the positions shown.

The result is that the 270 volt B+ line 404 of FIG. 1D cannot get through any of the switches 400 to the line 406, with the result that no B+ voltage is applied to the tone oscillator 410. This oscillator is therefore inactive. Similarly, since none of the switches 408 connect the 270 volt line 404 to the lead D, the carrier oscillator at 334 of FIG. 1C has no plate potential and is therefore inactive and the relay coil 18 is deenergized.

The 270 volt B+ line 404 of FIG. 1D, however, is connected through the series gang of switches at 408 to the line C, thereby applying a B+ voltage to the circuit of FIG. 1A by way of resistor 52 and coil 50 to the anode of RF amplifier tube 30. In FIG. 1A the 300 volt B+ line 100 is connected through appropriate resistors to the anodes of tubes 86, 92, 104, 118 and 122. The entire circuit, therefore, from the RF amplifier 30 to the power output tubes 118 and 122 is therefore active. The microphone or talk amplifier 160, however, is in an inactive condition, since its anode potential is supplied by way of line D which is open at the switches 408 of FIG. 1D.

Any amplitude modulated radio frequency signal received through the line H is therefore amplified and demodulated, but the audio signal does not appear at the input of amplifier 86 because of the open relay contacts 79—81. The speaker, therefore, remains silent. Any audio frequency signal present, however, passes through capacitor 76 of FIG. 1A to line G and thence to the input of tone amplifier 180 of FIG. 1B.

Thus, if a tone frequency from 5 kc. to 16 kc. is applied through the line G, it is amplified in the circuit of tube 180 and applied to control the univibrator at 194. The univibrator therefore oscillates at the frequency of the received tone signal, and the output of the univibrator is applied across tuned circuits 220 and 226. Since the amplified tone signal is not applied directly to these tuned circuits, but is used to control the univibrator, the signal strength of the tone frequency applied to the tuned circuits 220 and 226 will be uniform regardless of input signal strength.

The trigger circuit comprised of the tubes 230, 236 and 258 can have its input sensitivity adjusted as needed by varying the grid bias of the tubes 230 and 236 by means of the potentiometer 238. The bias is so set that if the tone signal applied, for instance to the resonant circuit 220, is out of resonance therewith, the signal applied to the grid of tube 230 will be insufficient to pass through this tube. Similarly, if it is out of resonance with the tuned circuit 226, there will not be sufficient voltage to actuate the tube at 236. The relative sensitivity or balance between the resonant circuits 220 and 226 is adjusted by means of the tuneable capacitor 203.

If, however, the signal is in resonance with either of these tuned circuits it will cause conduction through the tube connected across the resonant circuit so as to appear at the grid of the third tube 258. Any signal thus passing the trigger circuit will therefore be at the frequency of one or the other two tuned circuits 220 and 226.

If the tone signal passes the trigger circuit it is rectified by the tube at 272 and amplified by the D.C. amplifier 280. This energizes relay coil 286, thereby shifting relay contact 288 away from contact 294 and against contact 322. Separating contacts 294—288 deenergizes the tone amplifier circuit of tube 180 by disconnecting lead 186 which is energized from the B+ line 200 by way of relay coil 286.

The AVC voltage through line A of FIG. 1A, however, has been amplified by the two-stage D.C. amplifier 308—314 and thus appears through lead 320 at contact 322. This amplified AVC voltage therefore passes through contacts 322 and 288 so as to hold relay coil 286 energized after the tone signal has been cut off at the tone amplifier 180. Simultaneously operation of relay coil 286 connects output transformer lead F of the circuit of FIG. 1A through contacts 324 and 290 to the circuit of speaker 298. Simultaneously, relay contact 81 shifts from contact 83 to contact 79.

The result of this operation is that the tone signal, if it resonates with either of the circuits 220 or 226, connects the speaker to the output of the audio frequency amplifier and connects the detector output to the audio amplifier input.. Simultaneously it places the speaker relay under control of the AVC voltage, or, in other words, under the control of the carrier of the transmitting station. So long as the carrier remains on the line H, therefore, speech signals received over the line X will be transduced by the speaker at 298.

After the person at the calling station has finished talking, he switches his station from the "talk" to the "listen" condition, as will be explained presently, thereby taking his carrier off the line X. This removes the AVC voltage from line A and thus deenergizes relay coil 286 so as to return the circuit to its original condition. Under these circumstances the dynamic transducer at 298, which also can act as a microphone, is connected through relay contacts 290 and 296 to line B and thence to the input of the "talk" amplifier 160 of FIG. 1A. The output of this amplifier is also connected through contacts 81—83 to the input of the main audio amplifier beginning at tube 86.

If now the person wishes to talk, he selects for actuation the appropriate manual control of FIG. 1D for the station to be called. If the station to be called, for instance, has its circuit at 220 of FIG. 1B tuned to a frequency of 9 kc., the control so labeled in FIG. 1D will be actuated, thereby connecting capacitors 428 and 442 across coil 420.

Actuation of this control also shifts the appropriate switch 400 and disconnects the +270 volt lead 404 from the capacitor 402 and connects this capacitor to line 406. The initial 270 volt charge in the capacitor 402, therefore, supplies a potential to the anode of oscillator tube 410 for a short period, which can be anything desired, depending upon the size of the capacitor. An appropriate size for this capacitor is one which will keep the tube 410 in oscillation for approximately one-tenth of a second.

During this time interval the oscillatory signal is taken from the coil 420 through capacitor 424, resistor 426 and the line E and applied to the phase inverter section of the circuit of FIG. 1*a*. The amplified tone signal therefore appears in the power transformer secondary 150 and thence by way of line J to relay contact 22 of FIG. 1C.

Meanwhile, operation of switch 408 of FIG. 1D has applied the B+ voltage on the line 404 through the switch 408 connected with the line D and thence through relay coil 18 of FIG. 1C to the anode of the carrier oscillator 334. This current through relay coil 18 also closes contacts 22—26 so that the tone signal in line J is applied to the second grid of the power amplifier modulator 352. The B+ voltage for the anode of tube 352 also is supplied through line J by way of the primary 356 of output transformer 332. The result is that the carrier oscillator 334 goes into action as does the power amplifier modulator 352. The tone modulated carrier therefore appears on line X by way of contacts 24—16 and switch 12, since contacts 24—16 are closed when coil 18 is energized.

As previously described, the tone signal actuates whichever receiving circuit has a tuned circuit 220 or 226 of FIG. 1B which resonates therewith, so as to place the appropriate receiving station in condition to listen to the conversation. At the end of approximately one-tenth of a second, capacitor 402 will have run down sufficiently to silence the tone oscillator 410 of FIG. 1D, thereby clearing the line for conversation.

The reason for providing two tuned circuits, 220 and 226 is that each of the stations is assigned a frequency at which it alone will respond. The individual resonant circuits 220, for instance, are tuned to these different frequencies. It is, however, a great advantage under some circumstances, to have it possible for any station to call all of the stations on the line simultaneously. For this purpose one of the frequencies, such as 16 kc., can be used, and under these conditions all of the receivers will have the second circuit at 226 tuned to resonate at 16 kc. Thus by the operation of any but one of the controls, a selected individual station can be activated, while by operation of the additional control, all of the other stations can be connected to listen simultaneously. This is possible because of the high impedance input at each circuit, the R.F. amplification, and the automatic volume control, so far as conversation is concerned. The control circuit of FIG. 1B which is relatively insensitive to input signal strength also operates reliably even under the unusual circumstances encountered by equipment of this character. The sensitivity of the relay 286 to operation by the tone signal is adjusted at the potentiometer 282, while potentiometer 316 adjusts the sensitivity of the relay holding circuit. Overall sensitivity of the control circuit is adjusted at the trigger potentiometer 238.

It will be appreciated that the circuit shown can be considerably modified without departing from the spirit or scope of the invention, but in the interest of clarity of understanding of the invention this specific circuit has been shown and described, and in the interest of completeness, suitable values for use in this circuit are given hereinafter.

Tubes:

| | |
|---|---|
| 30—62 | 6AZ8 |
| 46 | NE51 |
| 86—160 | 6AW8 |
| 92—104 | 12AU7 |
| 118 | 6AQ5 |
| 122 | 6AQ5 |
| 180—258 | 6AW8 |
| 196—206 | 12AU7 |
| 230—236 | 12AU7 |
| 272—280 | 12AU7 |
| 308—314 | 12AU7 |
| 334—410 | 12BH7 |
| 352 | 6AQ5 |

Coils and tuned inductances:

| | |
|---|---|
| 18 | 10K 5 ma. |
| 32 | R.F.C. 5 hy. |
| 220 | .05 to .01 hy. tunable. |
| 226 | .05 to .01 hy. tunable. |
| 286 | 10K 5 ma. |
| 300 | 45 ohm. |
| 332 | Tank coil .001 hy. 100 to 300 kc. |
| 340, 344 | Osc. coil 100 to 200 kc. |
| 420 | .05 hy. tunable. |

Resistors:

| | | | |
|---|---|---|---|
| 34 | 470K | 208 | 5.6K |
| 40 | 820K | 212 | 390K |
| 44 | 680K | 214 | 120K |
| 52 | 27K | 232 | 1M |
| 66 | 560K | 234 | 1M |
| 68 | 500K | 238 | 100K |
| 72 | 2.2M | 240 | 100K |
| 80 | 1M | 244 | 33K |
| 88 | 1M | 246 | 33K |
| 94 | 470K | 248 | 68K |
| 98 | 56K | 250 | 68K |
| 102 | 470K | 260 | 5.6K |
| 106 | 5.6K | 264 | 47K |
| 110 | 220K | 266 | 120K |
| 112 | 220K | 274 | 4.7M |
| 124 | 330 ohm | 276 | 5.6K |
| 128 | 470K | 278 | 470K |
| 132 | 470K | 282 | 100K |
| 134 | 82K | 284 | 150K |
| 136 | 390K | 304 | 150 ohm |
| 146 | 33 ohm | 306 | 1M |
| 154 | 100 ohm | 310 | 5.6K |
| 164 | 1M | 312 | 470K |
| 168 | 1M | 316 | 100K |
| 170 | 56K | 318 | 150K |
| 174 | 470K | 336 | 15K |
| 178 | 33K | 354 | 22K |
| 182 | 1M | 360 | 27K |
| 184 | 470K | 412 | 2.2K |
| 188 | 1M | 416 | 390K |
| 198 | 4.7M | 426 | 1M |
| 202 | 33K | | |

Capacitors in $\mu$fd. unless otherwise indicated:

| | | | |
|---|---|---|---|
| 10 | .2 | 254 | .001 |
| 14 | .2 | 262 | .02 |
| 28 | .002 | 270 | .01 |
| 36 | .01 | 302 | .02 |
| 38 | .01 | 342 | .001 |
| 42 | .01 | 346 | .001 |
| 64 | .001 | 348 | .01 |
| 76 | .001 | 350 | .001 |
| 82 | .01 | 362 | .001 |
| 90 | .01 | 364 | .001 |
| 96 | .1 | 366 | 1400 to 3055 $\mu\mu$fd. |
| 116 | .01 | 402 | 5 |
| 120 | .01 | 414 | .01 |
| 130 | 10 | 418 | .001 |
| 138 | .01 | 424 | .001 |
| 148 | .01 | 428 | 880 to 2330 $\mu\mu$fd. |
| 162 | .02 | 430 | 100 to 550 $\mu\mu$fd. |
| 166 | .01 | 432 | 100 to 550 $\mu\mu$fd. |
| 176 | .001 | 434 | 100 to 550 $\mu\mu$fd. |
| 190 | .01 | 436 | 190 to 760 $\mu\mu$fd. |
| 192 | .001 | 438 | 190 to 760 $\mu\mu$fd. |
| 203 | 350–1180 $\mu\mu$fd. | 440 | 275 to 970 $\mu\mu$fd. |
| 210 | .001 | 442 | 650 to 1890 $\mu\mu$fd. |
| 216 | 470 $\mu\mu$fd. | 444 | 650 to 1890 $\mu\mu$fd. |
| 228 | 470 $\mu\mu$fd. | 446 | 880 to 2330 $\mu\mu$fd. |
| 242 | 470 $\mu\mu$fd. | 448 | 3000 to 6000 $\mu\mu$fd. |
| 252 | .001 | 450 | 4000 to 8000 $\mu\mu$fd. |
| 253 | .001 | | |

The circuit as explained above operates in such fashion that if there is a carrier on the line, a third person can cut in for the purpose of talking only; he cannot overhear any conversation already taking place. It may be preferable in some instances, however, to prevent any interruptions of any kind once the line is in use. The modification of FIG. 2 accomplishes this by preventing any station from putting its carrier on the line so long as the line is in use.

In FIG. 2 a triode at 500 has its grid connected through a resistor 502 to the line A of FIG. 1A. The previously mentioned AVC voltage in line A when present is therefore applied to this grid. The cathode of triode 500 is grounded through a resistor 504 and the anode thereof is connected through a variable resistor 506 to the 270 v. B+ line. This anode is also connected to the grid of a second triode 508, the cathode of which is connected to the 150 v. B+ line. The anode of tube 508 is connected to the 270 v. line through the coil 510 of a relay which operates two moving contacts 512 and 514. When the coil 510 is deenergized, contact 512 engages fixed contact 516 while when the coil is energized these contacts separate and contact 514 engages a contact 518.

Contacts 512 and 516 are connected in series between line D of FIG. 1C and line D of FIG. 1D. Contacts 514 and 518 are connected in series between the 6.3 v. filament supply and a pilot light 520. When this circuit modification is used, the busy signal circuit comprised of lamp 46 and resistor 44 of FIG. 1A is removed.

This circuit modification operates as follows. When there is no carrier on the power line, and hence no AVC voltage in line A, the relay coil 510 will be deenergized, since the circuit of tubes 500 and 508 acts as a D.C. amplifier similar to tubes 308 and 314 for instance. Under these conditions contacts 512 and 516 will be closed, thereby causing the main circuit to operate as previously described.

Whenever the power and signal line is in use, the carrier present thereon produces an AVC voltage in line A as previously described. This is amplified by tubes 500 and 508 and energizes coil 510, thereby separating contacts 512 and 516. This breaks the circuit to coil 18 of FIG. 1C and prevents operation of the system as a transmitter even if one of the talk buttons of FIG. 1D is actuated. Energization of coil 510 also closes contacts 514 and 518 and energizes the busy signal light 520.

Sensitivity of the circuit of FIG. 2 is adjusted at the variable resistor 506.

Suitable values for this circuit are as follows:

The triodes 500 and 508 are the two halves of a 12AU7. The relay 510 has a resistance of 10K and requires 5 ma. for operation. Resistors 502, 504 and 506 have values respectively of 1M, 5.6K and 500K.

From the above description of my invention and a specific embodiment thereof, it will be appreciated that various changes can be made without departing from either the spirit or scope of the invention and that the scope of the invention is to be measured by the scope of the following claims.

In the claims the "multivibrator" called for should be understood as being of the one shot type, sometimes referred to as a "univibrator."

Having described my invention, what I claim as new and useful and desire to secure by Letters Patent of the United States is:

1. A communications unit having a common input-output circuit for sending and receiving operation, a receiving circuit adapted to receive and demodulate a carrier to separate an audio frequency signal therefrom, a sending circuit adapted to produce and modulate a carrier with an audio frequency signal, relay means for connecting either said sending circuit or said receiving circuit to said common circuit for sending or receivng operation respectively, said relay means normally connecting said receiving circuit to said common circuit so that said system stands by in receiving condition, a transducer system adapted for connection as a speaker or as a microphone, second relay means operative for connecting said transducer either to said receiving circuit as a speaker to receive and transduce an audio frequency signal or to said sending circuit as a microphone, said second relay normally connecting said transducer as a microphone, circuit means connected to said receiving circuit and responsive to a received audio frequency tone signal of predetermined frequency for operating said second relay to disconnect said transducer as a microphone and connect said transducer to the receiving circuit as a speaker, a carrier responsive holding circuit connected to said receiving circuit, said holding circuit having connections for holding said second relay in condition for connecting said transducer to said receiving circuit as a speaker for the duration of a received carrier after said second relay has been operated by said tone signal and to switch said transducer to microphone operation upon the termination of the carrier, transmitting control means for actuating said sending circuit to produce a carrier and for operating the first said relay to connect said sending circuit to said common input-output circuit to transmit the carrier, calling means adapted when actuated to produce any selected one of several fixed audio frequency tone signals connected to the sending circuit for modulating the carrier with the last said tone signal, operating means for said calling means and said transmitting control means to actuate said sending circuit and said calling means, timing means connected for automatically limiting the duration of operation of said calling means to a brief time span, and means responsive to actuation of said operating means for connecting said transducer system as a microphone to said sending circuit to modulate said carrier at the termination of operation of said calling means.

2. A communications transceiver having a common input-output circuit for sending and receiving operation, a receiving circuit adapted to receive and demodulate a carrier to separate an audio frequency signal from said carrier, a sending circuit adapted to produce and modulate a carrier with an audio frequency signal, relay means for connecting either said sending circuit or said receiving circuit to said common circuit for sending or receivng operaton respectively, said relay means normally connecting said receiving circuit to said common circuit so that said system stands by in receiving condition, a speaker system, second relay means for connecting said speaker system to said receiving circuit to transduce a received audio frequency signal or alternatively to disconnect said speaker system from said receiving circuit to render said speaker system inoperative, said second relay normally disconnecting said speaker system, audio frequency responsive circuit means connected to said receiving circuit and responsive within a fraction of a second to a received audio frequency tone signal of predetermined frequency and connected for operating said second relay to connect said speaker system to the receiving circuit, a carrier responsive holding circuit connected to said receiving circuit, said holding circuit being connected to hold said second relay in condition for connecting said speaker system to said receiving circuit for the duration of a received carrier after said second relay has been shifted by said audio frequency tone signal and to disconnect said speaker from said receiving circuit upon the termination of said carrier, transmitting control means connected for actuating said sending circuit to produce a carrier and for operating the first said relay to connect said sending circuit to said common input-output circuit to transmit said carrier, calling means adapted when actuated for producing any selected one of several audio frequency tone signals connected to the sending circuit for modulating the transmitted carrier with the selected tone signal, operating means for said calling means and said transmitting control means to actuate said sending circuit to transmit a carrier and said calling means to modulate said carrier, and timing means connected for automatically limiting the duration of operation of said calling means to a fraction of a second.

3. A communications unit having a receiving circuit adapted to receive and demodulate a carrier to separate an audio frequency signal from said carrier, a sending circuit adapted to produce and modulate a carrier with an audio frequency signal, switching means adapted to make connections for effecting operation of either said sending circuit or said receiving circuit for sending or receiving operation respectively, said switching means normally effecting operation of said receiving circuit so that said system stands by in receiving condition, a transducer system adapted for connection as a speaker or as a microphone, relay means for connecting said transducer system to said receiving circuit as a speaker to transduce a received audio frequency signal or alternatively to disconnect said transducer system from said receiving circuit to render said transducer ineffective as a speaker and to connect said transducer system as a microphone, said relay normally disconnecting said transducer system from said receiving circuit, audio frequency responsive circuit means connected to said receiving circuit and responsive to a received audio frequency tone signal of predetermined pitch and connected for operating said relay to connect said transducer system to the receiving circuit as a speaker, a carrier responsive holding circuit connected to said receiving circuit, said holding circuit being connected to hold said relay in condition for connecting said transducer system to said receiving circuit for the duration of a received carrier after said relay has been shifted by said audio frequency tone signal and to disconnect said transducer from said receiving circuit upon the termination of said carrier, transmitting control means connected for actuating said sending circuit to produce a carrier and for operating said switching means to effect operation of said sending circuit to transmit a carrier, calling means operable for an interval of less than a second adapted when actuated for producing any selected one of several audio frequency tone signals, said calling means being connected to the sending circuit for modulating the transmitted carrier with the selected tone signal for a time interval of less than a second, operating means for said calling means and said transmitting control means to actuate said sending circuit to transmit a carrier and said calling means to modulate said carrier, and a carrier responsive disabling circuit connected to prevent said operating means from actuating said sending circuit and said calling means so long as a carrier is being received by said receiving circuit.

4. A communications unit having a receiving circuit adapted to receive and demodulate a carrier to separate an audio frequency signal from said carrier, a sending circuit adapted to produce and modulate a carrier with an audio frequency signal, switching means adapted to make connections for effecting operation of either said sending circuit or said receiving circuit for sending or receiving operation respectively, said switching means normally effecting operation of said receiving circuit so that said system stands by in receiving condition, a speaker system, relay means for connecting said speaker system to said receiving circuit to transduce a received audio frequency signal or alternatively to disconnect said speaker system from said receiving circuit to render said speaker system inoperative, said relay normally disconnecting said speaker system, audio frequency responsive circuit means connected to said receiving circuit and responsive to a received audio frequency tone signal of predetermined pitch and connected for operating said relay to connect said speaker system to the receiving circuit, a carrier responsive holding circuit connected to said receiving circuit, said holding circuit being connected to hold said relay in condition for connecting said speaker system to said receiving circuit for the duration of a received carrier after said relay has been shifted by said audio frequency tone signal and to disconnect said speaker from said receiving circuit upon the termination of said carrier, transmitting control means connected for actuating said sending circuit to produce a carrier and for operating said switching means to effect operation of said sending circuit to transmit a carrier, calling means operable for an interval of short duration adapted when actuated for producing any selected one of several audio frequency tone signals, said calling means being connected to the sending circuit for modulating the transmitted carrier with the selected tone signal for a brief time interval, operating means for said calling means and said transmitting control means to actuate said sending circuit to transmit a carrier and said calling means to modulate said carrier.

5. A circuit for supplying a substantially constant direct current potential from either of two tone signals of selected frequency which when present may vary in strength throughout a wide range, comprising, a multivibrator circuit, means for applying said tone signals to said multivibrator to control the frequency of oscillation thereof, a pair of tuned circuits tuned each to resonate at one of the selected frequencies connected to the output of said multivibrator, a pair of trigger circuits connected so that one receives the output of one of said tuned circuits and the other receives the output of the other of said tuned circuits, each of said trigger circuits having a sensitivity sufficient to pass current only when its tuned circuit resonates at the frequency of its input signal, and common means connected to both said trigger circuits to rectify the output of both of said trigger circuits.

6. A circuit for connecting a speaker system to transduce the output of an audio circuit in response to a tone signal of either of two frequencies comprising, a multivibrator circuit, means for applying the output of the audio circuit to said multivibrator to control the frequency of oscillation thereof, a pair of tuned circuits tuned each to resonate at one of a pair of selected frequencies, means connecting said multivibrator to said tuned circuits to supply the output of said multivibrator to said tuned circuits, a pair of trigger circuits connected to said tuned circuits so that one receives the output of one of said tuned circuits and the other receives the output of the other of said tuned circuits, each of said trigger circuits having a sensitivity sufficient to pass current only when its tuned circuit resonates, common rectifying means connected to receive the output of both of said trigger circuits, a relay adapted when energized to connect said speaker system to said audio circuit, and means for energizing said relay from said rectifying means.

7. A selectively responsive communications receiver adapted to operate as one of several connected to the same transmission line supplied with a carrier adapted to be briefly tone signal amplitude modulated for calling a certain receiver followed by amplitude speech modulation to be transduced by the called receiver only, comprising: a radio frequency amplifier, high impedance untuned coupling means connecting said amplifier to said line, a demodulator connected to said amplifier to separate an audio frequency signal from said carrier, said demodulator being adapted to supply a control voltage in response to the presence of a carrier, means responsive to said control voltage for regulating the gain of said amplifier, an audio frequency amplifier adapted for connection to said demodulator, a speaker adapted for connection to said audio amplifier, relay means normally disconnecting said speaker from said audio amplifier and said audio amplifier from said demodulator but adapted so to connect said speaker and amplifier when said relay means is operated, a multivibrator circuit, means for connecting said demodulator to said multivibrator to supply said tone signal to said multivibrator to control the frequency of oscillation thereof, a tuned circuit tuned to a selected tone signal connected to receive the output of said multivibrator frequency, a trigger circuit connected to receive the output of said tuned circuit, said trigger circuit having a sensitivity sufficient to pass current only when the tuned circuit resonates at a certain tone signal frequency, means to rectify the output of said trigger circuit, means connecting said relay means to said rectifying means for operating said relay means from said rectifying means, a holding circuit adapted upon operation of said relay means to hold said relay operated so long as said holding circuit is energized, and means connecting said holding circuit to said demodulator for energizing said holding circuit from said demodulator control voltage.

8. A selectively responsive communications receiver adapted to operate as one of several connected to the same transmission line supplied with a carrier adapted to be briefly tone signal amplitude modulated for calling a certain receiver followed by amplitude speech modulation to be transduced by the called receiver only, comprising: a radio frequency amplifier, high impedance untuned coupling means connecting said amplifier to said line, a demodulator connected to said amplifier to separate an audio signal from said carrier, said demodulator being adapted to supply an AVC control voltage in response to the presence of a carrier, means connecting said AVC voltage to said amplifier to control the gain thereof, an audio frequency amplifier-speaker combination connected to said demodulator to receive an audio signal from said demodulator, relay means normally interrupting operation of said audio amplifier-speaker combination but adapted to cause operation of the last said combination when said relay means is operated, a resonant circuit tuned to a selected tone signal frequency, means for connecting said resonant circuit to said demodulator to receive an audio tone signal from said demodulator, a trigger circuit connected to receive the output of said resonant circuit, said trigger circuit having a sensitivity sufficient to pass current only when the resonant circuit resonates, including a rectifier and an amplifier for operating said relay means from said trigger circuit, a holding circuit adapted upon operation of said relay means to hold said relay operated so long as said holding circuit is energized, and means including connections between said demodulator and said holding circuit for energizing said holding circuit from said demodulator AVC voltage.

9. In a communications unit having circuits for transmitting and receiving an amplitude modulated carrier, of substantially a single frequency, constantly operating means connected for receiving said carrier and for producing a direct current potential in response thereto, manual means operable for shifting operation of said circuits from receiving to transmitting condition, and a master circuit connected to be responsive to the presence of said direct current potential for preventing operation of said circuit as a transmitter so long as a carrier is being received by said constantly operating means.

10. The combination called for in claim 4 in which said receiving circuit includes a radio frequency amplifier and a detector, said detector having a terminal providing a source of an AVC voltage, said holding circuit being voltage responsive and having a terminal for the application of an actuating voltage thereto, said radio frequency amplifier having a terminal the potential of which determines the radio frequency gain and means connecting said detector AVC terminal to said holding circuit terminal and for connecting said detector AVC terminal to said radio frequency amplifier terminal.

11. The combination called for in claim 4 in which said tone signal responsive circuit means comprises a univibrator, means connected to the receiving circuit to supply the audio frequency output thereof to said univibrator to control the frequency of oscillation thereof, a tuned circuit tuned to resonate at the desired tone frequency connected to the univibrator to receive the output thereof, a trigger circuit connected to the tuned circuit to receive the output thereof and conditioned to be triggered only when said tuned circuit resonates, means connected to the trigger circuit to rectify and amplify the output of said trigger circuit, and means connected to the rectifying and amplifying means to supply the output thereof to said relay to actuate said relay.

References Cited in the file of this patent

UNITED STATES PATENTS

| | | |
|---|---|---|
| 2,089,824 | Bossart | Aug. 10, 1937 |
| 2,427,850 | Gehman | Sept. 23, 1947 |
| 2,524,782 | Ferrar | Oct. 10, 1950 |
| 2,531,416 | Ferrar | Nov. 28, 1950 |
| 2,766,324 | Peth | Oct. 9, 1956 |